(12) United States Patent
Hochmuth

(10) Patent No.: US 7,565,261 B2
(45) Date of Patent: Jul. 21, 2009

(54) GENERATING AN ALERT TO INDICATE STALE DATA

(75) Inventor: Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/537,379

(22) Filed: Sep. 29, 2006

(65) Prior Publication Data
US 2008/0082293 A1    Apr. 3, 2008

(51) Int. Cl.
*G04F 3/00* (2006.01)
*G04F 5/00* (2006.01)
*G04F 8/00* (2006.01)
*G04F 10/00* (2006.01)

(52) U.S. Cl. ..................................... 702/176
(58) Field of Classification Search ........... 702/79, 702/125, 176, 178, 186, 187, 58, 183, 185; 709/232, 233, 247; 370/235, 241, 242, 468
See application file for complete search history.

(56) References Cited

U.S. PATENT DOCUMENTS

| 5,384,713 | A | * | 1/1995 | Kleinfelder | ................. | 700/306 |
| 5,774,057 | A | * | 6/1998 | Kalbermatter | ......... | 340/825.21 |
| 6,980,518 | B1 | * | 12/2005 | Sun et al. | ..................... | 370/235 |
| 7,042,360 | B2 | * | 5/2006 | Light et al. | ............... | 340/572.1 |
| 2002/0110242 | A1 | * | 8/2002 | Bruwer | ........................ | 380/255 |
| 2002/0124078 | A1 | * | 9/2002 | Conrad | ........................ | 709/224 |
| 2003/0023716 | A1 | * | 1/2003 | Loyd | ........................... | 709/224 |
| 2004/0081201 | A1 | * | 4/2004 | Simonnet et al. | ............ | 370/469 |
| 2004/0242265 | A1 | * | 12/2004 | Kawamura | ............... | 455/550.1 |
| 2006/0087687 | A1 | * | 4/2006 | Eom | .......................... | 358/1.15 |
| 2006/0103657 | A1 | * | 5/2006 | Marks et al. | ................. | 345/522 |
| 2007/0234882 | A1 | * | 10/2007 | Usa et al. | ....................... | 84/612 |
| 2007/0294393 | A1 | * | 12/2007 | Smith et al. | ................. | 709/224 |

FOREIGN PATENT DOCUMENTS

JP    09-191314    *    7/1997

OTHER PUBLICATIONS

English Abstract for CN 1960277, May 9, 2007.*

* cited by examiner

*Primary Examiner*—Michael P Nghiem

(57) ABSTRACT

A method for indicating stale data whereby a receiving system receives images and sync messages from a sending system and computes a time difference between a current time and a time a last sync message was received from the sending system. If such a time difference meets or exceeds a first threshold, the an alert is generated.

25 Claims, 4 Drawing Sheets

GENERATING AN ALERT TO INDICATE STALE DATA

BACKGROUND

Some electronic systems permit a user of one computer (a receiving system) to view on his or her display images (graphics and text) that are generated on another computer (a sending system) remotely located from the user's computer. In some such systems, the sending system where the graphics data is generated transmits images to the user's receiving computer that causes the user's computer to replicate the images on the computer where the images originated.

It is possible that the flow of images from the sending system to the receiving system becomes disrupted. Reasons for such disruption include network congestion, network failures, etc. The disruptions can be temporary or permanent (pending repair). When the flow of images to the receiving system ceases, the information being displayed on the receiving system may be out-of-date (i.e., stale). Viewing stale data can be problematic for many users, particularly for users who need to rely on current, accurate data.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising " are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
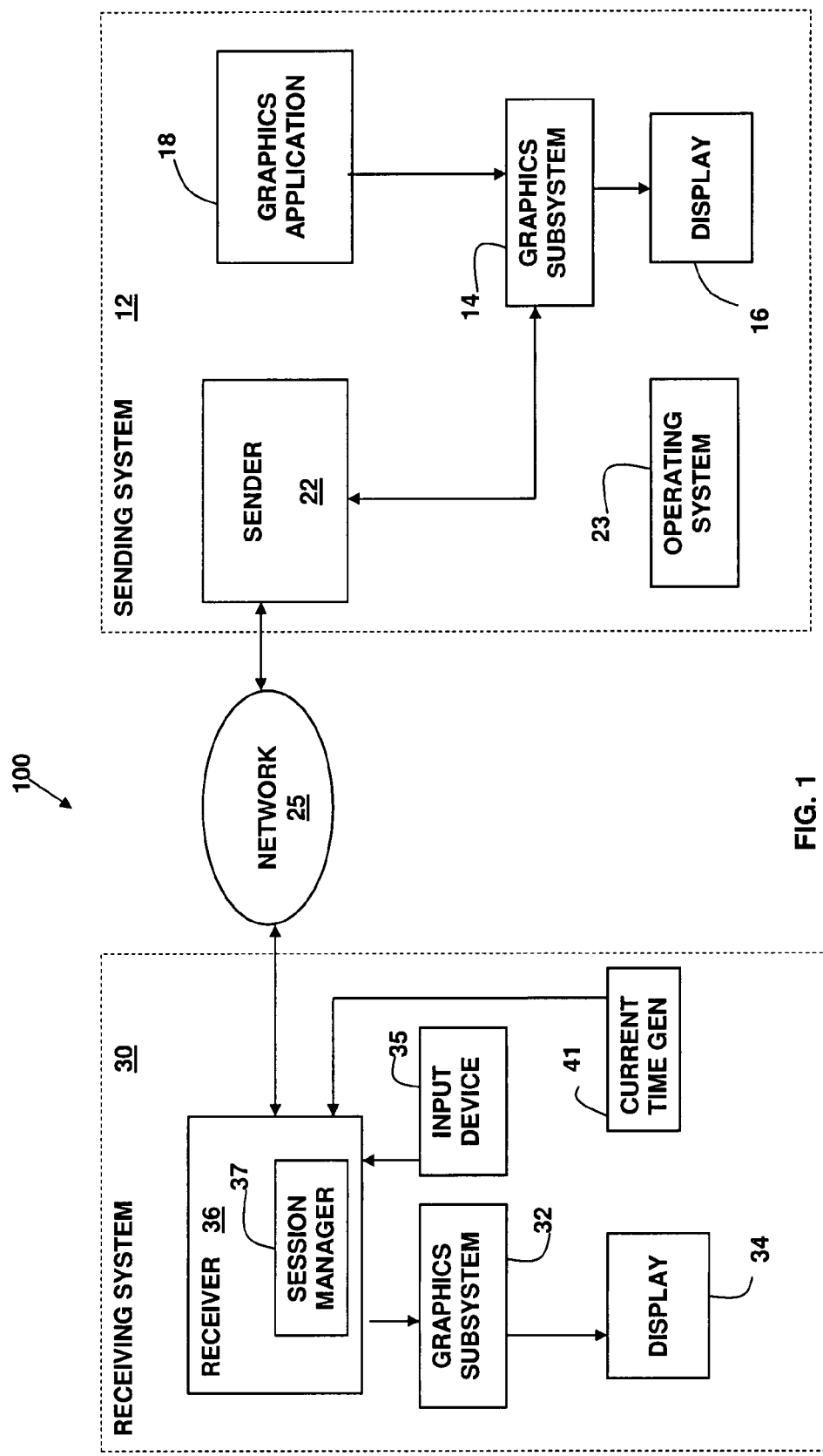
FIG. 1 shows a system in accordance with various embodiments comprising a sending system and a receiving system.
Figure 2:
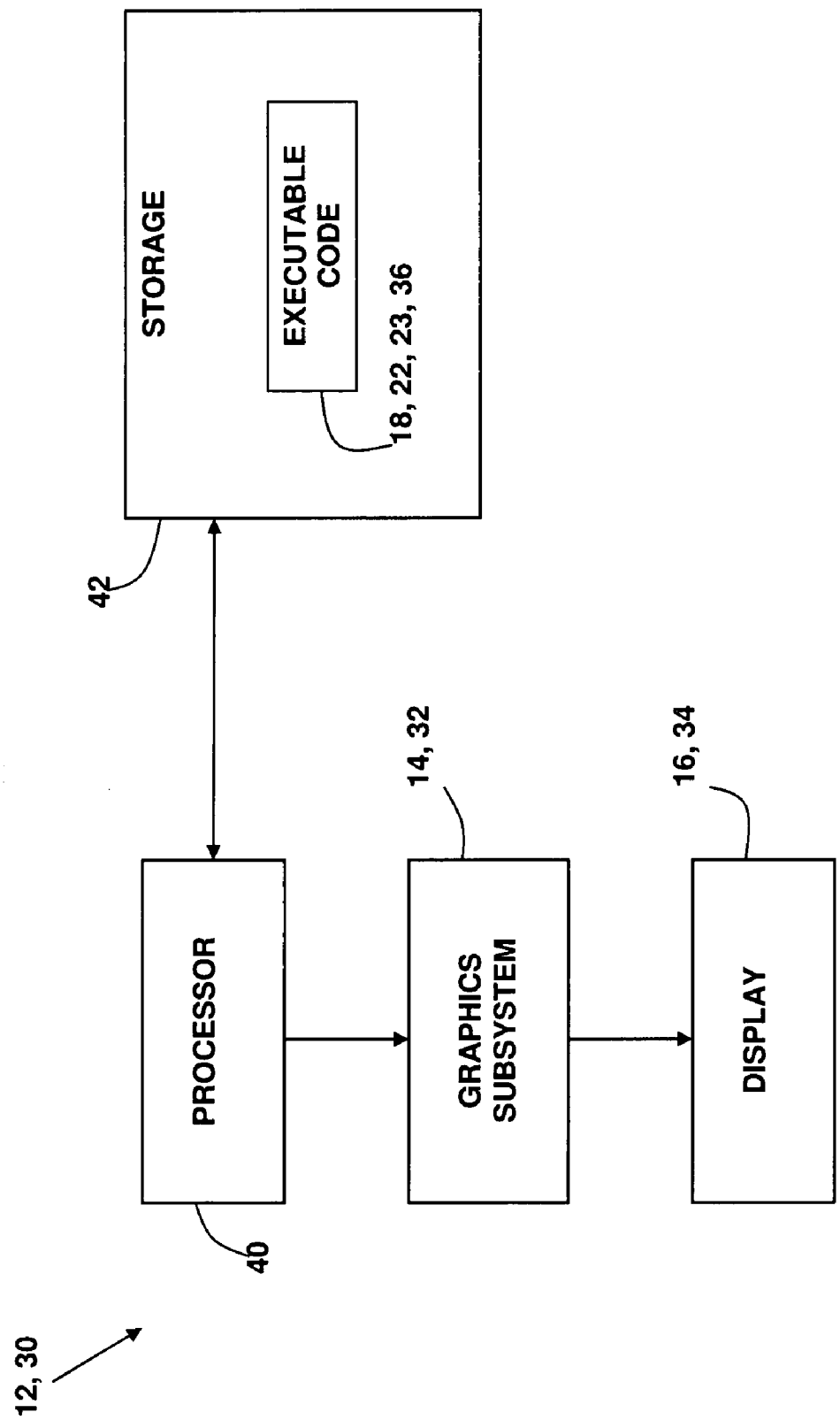
FIG. 2 shows an embodiment exemplary of a sending system or a receiving system.

FIG. 1 shows an embodiment comprising a system 100. System 100 comprises a sending system 12 and a receiving system 30 in communication with each other by way of a network 25. Network 25 may comprise the Internet or other form of communication network. Network 25 may include a point-to-point communication link, as well as multi-drop networks as are typical of local area networks. As shown, the sending system 12 comprises a graphics subsystem 14, a display 16, a graphics application 18, a sender 22 and operating system 23. The graphics application 18 and sender 22 comprise executable code. The receiving system 30 comprises a graphics subsystem 32, a display 34, and a receiver 36. The receiver 36 in the receiving system comprises executable code. Referring briefly to FIG. 2 in conjunction with FIG. 1, each of the sending system 12 and receiving system 30 comprises a processor 40, storage 42, and, as noted above, a graphics subsystem 14, 32 and a display 16, 34. Each executable code (i.e., the graphics application 18, the sender 22, the operating system 23, and the receiver 36) in the illustrated embodiment are executed by the respective processor 40 in that system and are stored in storage 42. Storage 42 may comprise a computer-readable medium such as volatile storage (e.g., random access memory), non-volatile storage (e.g., hard disk drive) or a combination thereof. Each of the graphics subsystems 14 and 32 may comprise additional executable code such as application programming interfaces (APIs), graphics drivers, one or more hardware components such a graphics adapter, etc. Each graphics subsystem also includes at least one frame buffer into which pixel color values are temporarily stored to render pixels on the associated display.

Referring to FIG. 1, sending system 12 executes a graphics application 18 that causes images (e.g., text, lines, fills) to be shown by the graphics subsystem 14 on the display 16. The graphics application 18 comprises any one or more of a plurality of executable programs that use a graphics API. The APIs used by the graphics application are implemented by the graphics subsystem 14. The graphics application 18 causes images to be shown on display 16 by providing graphics commands to the graphics subsystem 14 which creates and stores images in a frame buffer in the graphics subsystem 14. The sender 22 reads the images from the graphics subsystem's frame buffer and, in at least some embodiments, compresses the images for subsequent transmission to the receiving system 30. Via network 25, the sending system 12 sends the compressed images to the receiving system 30. In those embodiments, the receiving system 30 receives the compressed images from the sending system, decompresses the images, and shows the decompressed images on display 34. The process is repetitive as the sending system continues to render new or updated images in its own graphics subsystem 14.

In some embodiments, the sending system 12 has a display 16 coupled thereto, but in other embodiments, the sending system's display 16 is not included. The receiving system 30 may comprise an input device 35, such as a keyboard or mouse, which enables a user of the receiving system to interact with the graphics application 18 as if the graphics application were being executed on the receiving system 30.

Referring still to FIG. 1, the receiver 36 comprises a session manager 37. In at least some embodiments, the receiver 36 and session manager 37 are implemented in software. In general, the session manager 37 is responsible for determining when data being shown on the display 34 may be stale and generating an alert to so indicate. Upon being informed of the alert, a user of the receiving system 30 can determine an appropriate course of action such as ignoring the displayed data and waiting for the alert to subside and the data to again to be valid, forcing a refresh, etc.

The sender 22 sends periodic sync messages to the receiver 36. The receipt of the sync messages helps the receiving system 30 to determine that the sending system 12 and the network 25 between the sending system 12 and receiving system 30 are functional. Another term applicable for the synch message is a "heartbeat." The sender 22 sends sync messages at a periodic interval such as once per second, although other rates are possible as well. The format of each sync message can be in accordance with any desired format. The receiver 36 receives messages packets from the sender 22 and determines which messages are sync messages based upon one or more bits in the messages (e.g., a header, opcode, etc.).

The receiving system 30 comprises a current time generator 41 (e.g., a clock, counter, etc.) that enables the receiving system 30 to generate and keep track of the current time of day. The receiver's session manager 37 reads the current time from the current time generator 41. The session manager 37 determines the current time upon receipt of each sync pulse from the sender 22. The session manager determines the length of time that has transpired since the last time a sync pulse was received.

In accordance with embodiments, the session manager 37 compares the time difference between the current time and the time the receiver 36 last received a sync message to various thresholds including at least a first threshold and a second threshold. The first threshold is smaller than the second threshold. Once the time difference equals and/or exceeds the first threshold, the session manager generates an alert that the information displayed on the display 34 may be stale. That is, the session manager 37 has determined that one or more sync messages have not been received, indicating a possible temporary or permanent communication failure between the sending and receiving systems, and thus the information shown on display 37 may not be trustworthy. The receiver 36, however, does not disconnect from the sender 22 at this time as the communication problem may only prove to be temporary. Once the time difference, however, exceeds a second (larger) threshold, the communication problem is deemed to be more than transient and may be permanent (pending a subsequent repair) and the receiver 36 disconnects from the sender 22. The session manager 37 generates a notification at this point to alert the user that the receiver 36 has disconnected from the sender. Moreover, prior to the receiver 36 actually disconnecting from the sender, the user is alerted that a communication problem is occurring and that the data being viewed may thus be stale. Thus, the user is given advanced warning of the status of the data being viewed on display 34. Without this advanced warning, the user would not know that the data is stale until the receiver 36 suddenly disconnects from the sender 22.

It is possible that, after the initial alert is generated, the connection between the receiver 36 and sender 22 is re-established. In this situation, the sync messages again start flowing from the sender 22 to the receiver 36. As such, the time difference between the current time and time of receipt of the last sync message never meets or exceeds the second threshold. The session manager 37 thus removes the initial alert thereby informing the user that the data is not stale, and the receiver does not disconnect from the sender 22. In some embodiments, the first and second thresholds are adjustable and/or programmable. The first threshold may be set, for example, at about 2 seconds, while the second threshold may be set at about 30 seconds.

Figure 3:
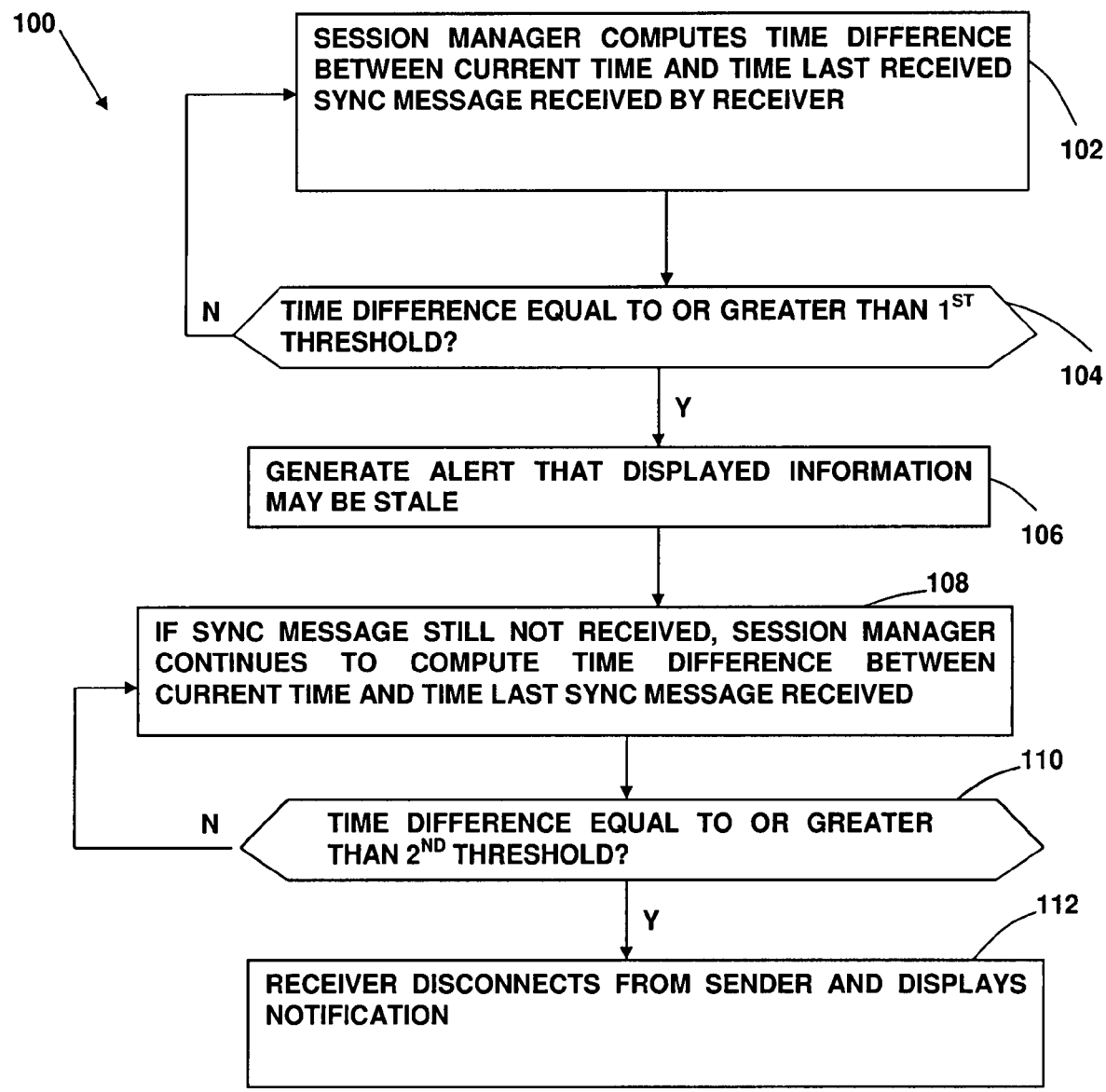
FIG. 3 illustrates a method in accordance with embodiments.

FIG. 3 shows an embodiment of a method 100 of generating an alert of the existence of possibly stale data. At 102, the session manager 37 computes a time difference between the current time and the time the last sync messages was received by the receiver 36. At 104, the session manager 37 determines whether the time difference is equal to or greater than the first threshold. If the time difference has not yet reached the first threshold, control loops back to 102 at which the time difference is again computed. If, however, the time difference equals or exceeds the first threshold, control moves to 106 at which the session manager 37 generates an alert that the information provided on display 34 may be stale.

At 108, the session manager 37 continues to compute the time difference between the current time and the time the last sync messages was received by the receiver 36. Action 108 is performed as long as sync messages do not start to be received by the receiver 36. If a sync message is received by the receiver 36 after the alert has been generated in 106, the alert is removed and control starts over at 102. At 110, the session manager 37 determines whether the time difference is equal to or greater than the second threshold. If the time difference has not yet reached the second threshold, control loops back to 106 at which the time difference is again computed. If, however, the time difference equals or exceeds the second threshold, control moves to 112 at which the session manager 37 causes the receiver 36 to disconnect from the sender 22 and to provide a notification to the user that the connection has been severed.

Figure 4:
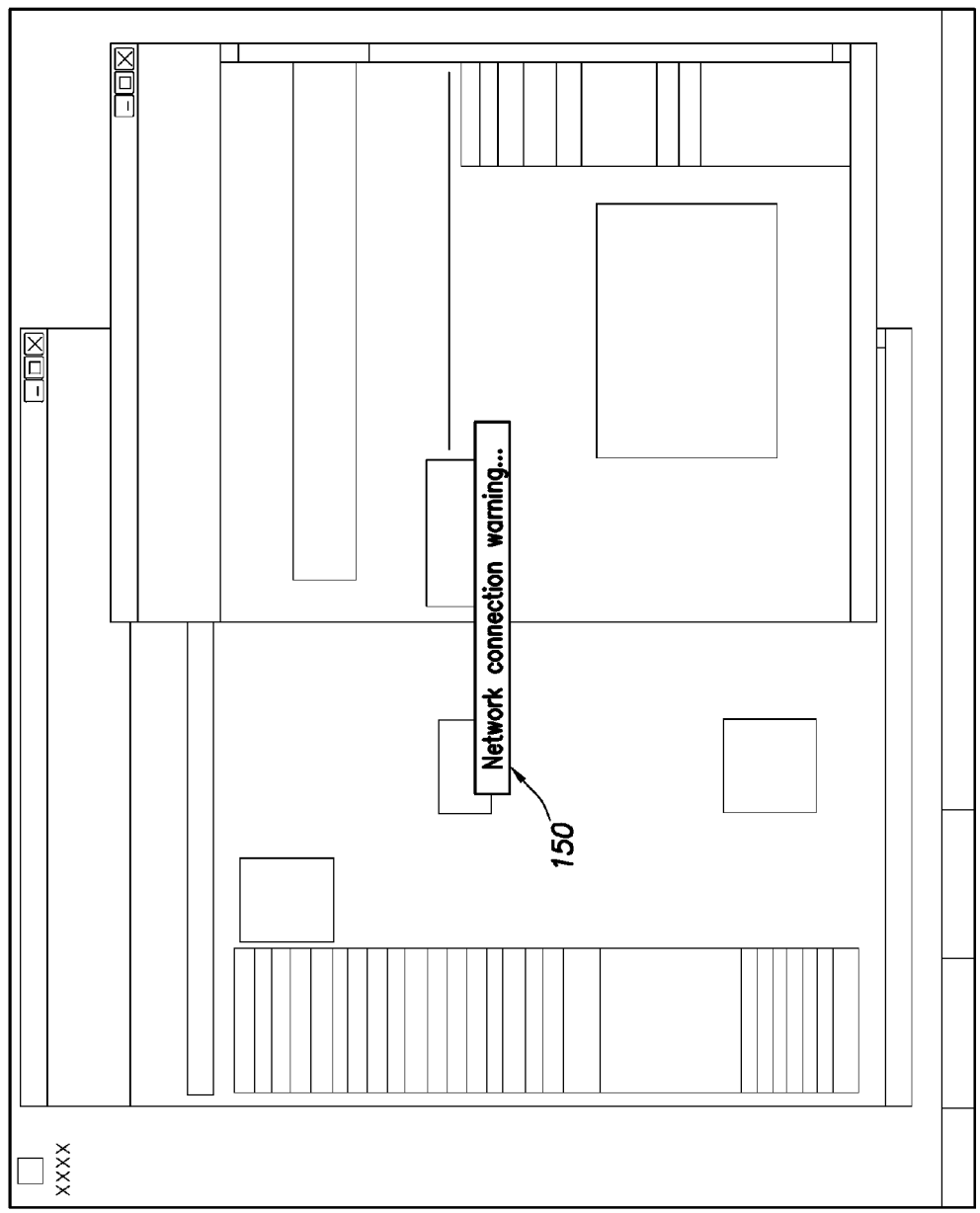
FIG. 4 shows an example of an alert in accordance with embodiments.

Any of a variety of different types of alerts can be generated at 106. The alert can be visual, audible, or a combination of both visual and audible. As a visual alert, the alert could comprise a "pop up" visual indicator that is displayed super-imposed over at least a portion of the display 34. A visual alert may comprise a status indicator or progress bar that provides textual information stating, for example, that one or more items of displayed information may be stale. The alert could comprise a visual timer that is constantly or periodically updated to indicate the time difference explained above. Another embodiment of a visual alert comprises a watermark that is super-imposed over at least a portion of the display 34. A watermark may or may not over-write and hide the underlying information being displayed. In other embodiments, the alert can be implemented by altering the brightness level of the display 34. For example, a sudden reduction in the brightness of the display 34 can indicate that the data being shown may be stale. A freshness indicator could be implemented that indicates how stale the data may be. For example, a color associated with the freshness indicator could be made to change as the time difference increases. In one embodiment, the freshness indicator may begin as green, then turn to yellow, then orange, and then red as the time difference increases towards the second threshold. Alternatively, the freshness indication can be encoded in the rate of blinking of the indicator. For example, the freshness indicator may initially blink relatively slowly. The blink rate could begin to increase as the time difference increases towards the second threshold. Any of the preceding types of alerts (or other types) can be implemented, as well as combinations of such alert types FIG. 4 shows an example of an alert in which the display is dimmed and a pop-up alert message 150 is shown super-imposed over the information otherwise being shown.

In accordance with an embodiment of the invention, a user-activated software control can also be provided with the alert. If implemented, the control provides the user the ability to have the receiver 36 disconnect immediately from the sender 22, rather than waiting for the second time threshold to occur.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving images and sync messages, by a receiving system, from a sending system;

the receiving system computing a time difference between a current time and a time a last sync message was received from the sending system; and when said time difference meets or exceeds a first threshold, generating an alert that indicates that a received image may be stale.

2. The method of claim 1 further comprising said receiving system periodically receiving sync messages from the sending system as long as the sending system and a connection between the sending and receiving systems are operational.

3. The method of claim 1 further comprising, after generating the alert, the receiving system continuing to compute the time difference between the current time and the time a last sync message was received from the sending system.

4. The method of claim 1 further comprising disconnecting the receiving system from the sending system if the time difference meets or exceeds a second threshold.

5. The method of claim 4 further comprising disconnecting the receiving system from the sending system if the time difference meets or exceeds a second threshold, said second threshold being larger than the first threshold.

6. The method of claim 4 further comprising providing a notification that the disconnection has occurred.

7. The method of claim 1 wherein generating an alert comprises generating an alert selected from a group consisting of a visual alert and an audible alert.

8. The method of claim 1 wherein the alert comprises an alert selected from a group consisting of a status indicator, a visual timer, a watermark, a progress bar, an alteration of a brightness level of a display, a freshness indicator, and blinking of at least a portion of information shown on a display.

9. The method of claim 1 wherein generating an alert comprises generating an alert that information presented on the receiving system may be stale.

10. A system, comprising:
a receiver that receives images from a sending system;
wherein said receiver determines a time difference between a current time and a time a last sync message was received from a sending system, and,
when the time difference meets or exceeds a first threshold, the receiver generates an alert that indicates that a received image may be stale.

11. The system of claim 10 wherein said receiver periodically receives sync messages from the sending system as long as the sending system and a connection between the sending and receiving systems are operational.

12. The system of claim 10 wherein, after generating the alert, the receiver continues to compute the time difference between the current time and the time a last sync message was received from the sending system.

13. The system of claim 10 wherein the receiver disconnects the receiving system from the sending system if the time difference meets or exceeds a second threshold.

14. The system of claim 13 wherein the second threshold is larger than the first threshold.

15. The system of claim 13 wherein the receiver generates a notification that the disconnection has occurred.

16. The system of claim 10 wherein the alert comprises an alert selected from a group consisting of a status indicator, a visual timer, a watermark, a progress bar, an alteration of a brightness level of a display, a freshness indicator, blinking of at least a portion of information shown on a display, and an audible alert.

17. The method of claim 10 wherein the alert indicates that information presented on the system may be stale.

18. A system, comprising:
a receiver having a display; and
a sender remotely coupled to said receiver, said sender sends images to the receiver to be shown on the display;
wherein said receiver determines a time difference between a current time and a time a last sync message was received from a sending system, and,
when the time difference meets or exceeds a first threshold, the receiver generates an alert that indicates that a received image may be stale.

19. The system of claim 18 wherein, after generating the alert, the receiver continues to compute the time difference between the current time and the time a last sync message was received from the sender, and, when the time difference meets or exceeds a second threshold, the receiver disconnects the receiving system from the sender.

20. The system of claim 18 wherein, after generating the alert, the receiver continues to compute the time difference between the current time and the time a last sync message was received from the sender.

21. The system of claim 18 wherein the alert comprises an alert selected from a group consisting of a status indicator, a visual timer, a watermark, a progress bar, an alteration of a brightness level of a display, a freshness indicator, blinking of at least a portion of information shown on a display, and an audible alert.

22. The system of claim 18 wherein the alert indicates that information shown on the display may be stale.

23. A computer-readable medium containing software that, when executed by a processor, causes the processor to:
receive images and sync messages from a sending system;
compute a time difference between a current time and a time a last sync message was received from the sending system;
when said time difference meets or exceeds a first threshold, generate an alert that indicates that a received image may be stale.

24. The computer-readable medium of claim 23 wherein the alert generated by said software indicates that information presented by said processor on a display may be stale.

25. The computer-readable medium of claim 23 wherein said software causes the processor to disconnect a connection to the sending system if the time difference meets or exceeds a second threshold.

* * * * *